United States Patent
Vaill et al.

(10) Patent No.: US 7,019,230 B1
(45) Date of Patent: Mar. 28, 2006

(54) RACKING DEVICE AND POWER MODULE THEREFOR

(75) Inventors: Ronald E. Vaill, Irwin, PA (US); Mark W. Jacobsen, Spartanburg, SC (US); Judith Robin M. Prince, Edgefield, SC (US); Barry T. Rambo, Bradley, SC (US); David M. Garbulinski, Mars, PA (US); Larry E. Yonce, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/196,357

(22) Filed: Aug. 3, 2005

(51) Int. Cl.
*H01H 9/00* (2006.01)

(52) U.S. Cl. ............... 200/50.24; 200/50.21

(58) Field of Classification Search .. 200/50.21–50.26; 361/605–610, 615, 619
See application file for complete search history.

(56) References Cited

U.S. PATENT DOCUMENTS

| | | | |
|---|---|---|---|
| 4,269,285 A | | 5/1981 | Ohkoshi et al. |
| 4,396,813 A | * | 8/1983 | Hesselbart et al. ...... 200/50.21 |
| 5,453,587 A | | 9/1995 | Hurley et al. |
| 5,477,017 A | * | 12/1995 | Swindler et al. ......... 200/50.24 |
| 6,404,620 B1 | * | 6/2002 | Piccione ..................... 361/601 |
| 6,727,442 B1 | | 4/2004 | Byron et al. |
| 6,777,627 B1 | * | 8/2004 | Stevenson ................ 200/50.21 |
| 6,897,388 B1 | * | 5/2005 | Greer ....................... 200/50.24 |
| 2003/0200648 A1 | | 10/2003 | Greer |

* cited by examiner

*Primary Examiner*—Michael A. Friedhofer
(74) *Attorney, Agent, or Firm*—Martin J. Moran

(57) ABSTRACT

A racking device performs a circuit breaker racking operation. The racking device includes a base with wheels and a brake to facilitate moving the racking device and positioning it with respect to a switchgear cabinet. An elongated tubular member extends substantially vertically from the base. A self-contained counter-balanced power module includes an enclosure having a pair of opposing openings for receiving the elongated tubular member, and a counterweight system for counter-balancing the power module. An actuator including a motor, a ball spline and a torque member moves a linkage assembly having an end effector with a negator spring that positively engages the circuit breaker. A switch module actuates the actuator from a remote location in order to move the linkage assembly and thus the circuit breaker to perform the racking operation from the remote location. Complicated field programming of the power module is not required.

20 Claims, 4 Drawing Sheets

RACKING DEVICE AND POWER MODULE THEREFOR

BACKGROUND OF THE INVENTION

1. Field of the Invention

The present invention relates generally to electrical apparatus and, more particularly, to a racking device for manipulating an electrical switching apparatus, such as a circuit breaker. The invention also relates to a power module for a racking device.

2. Background Information

Electrical switching apparatus, such as relatively large circuit breakers, are commonly disposed in an enclosure or housing structure having a plurality of compartments or sections. The circuit breakers may be stacked, as shown in FIG. 1, or they may be disposed in any other suitable configuration within the housing structure. Large circuit breakers are typically heavy, often weighing as much as 1000 lbs. or more. Therefore, in order to facilitate the manipulation (e.g., insertion, removal, adjustment, or any other movement) of the circuit breaker, it is usually necessary to employ a moving device commonly referred to as an extraction or racking device.

FIG. 1 shows an example of a racking device 2 comprising a frame 4 including a bucket 6 for supporting the electrical apparatus (e.g., circuit breaker 8) being manipulated. A drive gear 10 is used to move the bucket 6 vertically along a pair of guide rails 12 (only one rail 12 is shown), and a set of trucks or wheels 14 are disposed on an elongated base 5 for moving the entire racking device 2 toward and away from the housing structure 16. By way of example, in operation, the racking device 2 is generally placed in front of the housing structure 16 with the guide rails 12 being aligned with the vertical sides of the housing structure 16. Brakes (not shown in FIG. 1) on each wheel 14 are then set in order to lock the wheels 14. The circuit breaker 8, which typically has a pair of roller wheels 18, is then rolled out of the housing structure 16 onto the bucket 6 of the racking device 2. Once the circuit breaker 8 is on the racking device 2, the brakes are released to remove the circuit breaker 8. Installation of a circuit breaker 8 follows essentially the same procedure, except in reverse. Other circuit breaker manipulations, such as shuffling the position of one or more circuit breakers within the housing structure 16, can also be accomplished using the vertical movement capabilities of the racking device 2.

Racking devices of this nature suffer from a number of disadvantages. Among them is the fact that the racking device 2 is generally bulky and awkward to manipulate. Specifically, the base 5 of the frame 4 of the racking device 2 extends from the guide rails 12 a relatively far lateral distance thereby making the device base 5 unnecessarily large and difficult to transport and maneuver and align with respect to the housing structure 16. The bucket 6 is also generally heavy and difficult to adjust vertically. There is, therefore, a need for a smaller, more compact and maneuverable racking device.

Additionally, conventionally, an operator performing the circuit breaker manipulation has been required to be in physical proximity with the racking device 2. Therefore, the operators are typically required to wear approved personal protection equipment (PPE) to resist serious injury that could result if an electrical failure were to occur during the racking process. However, PPE is generally bulky, hot and uncomfortable which dissuades operators from wearing it. An alternative solution is desired. There is, therefore, also a need for a racking device which may be remotely operated.

U.S. Patent Application Pub. No. 2003/0200648 is an example of one attempt to provide a remote power racking system. Like the racking device 2 of FIG. 1, the disclosed racking apparatus includes a frame forming a large base and a pair of guide rails extending upwardly from the base. Also included are an electric motor having a shaft, an adaptor arranged to be coupled to an industrial circuit breaker, and an actuating assembly which provides vertical movement of the motor. A controller is carried by the frame for controlling the motor and the actuating structure and a control station is operatively associated with the controller in order to operate the controller from a remote location. However, not only are the frame and the base portion thereof large and difficult to maneuver, but the system is also complex. For example, vertical movement of the motor actuating assembly requires the combination of multiple components including at least a chain, sprockets, a second motor, and a piston and actuator, in order to provide vertical movement of the motor on the frame guide rails. The motor and shaft assembly are also relatively heavy, making manual vertical adjustment of the device very difficult for the operator. The associated method of operating the racking apparatus is also complex. Specifically, among the requirements of the disclosed racking apparatus is that it relies upon a torque profiler, for example, which is dependent upon the exact type of circuit breaker and its location (e.g. cell) on the rack in order to profile torque over the entire range of movement of a racking operation. There is, therefore, a further need for a simplified racking device and method which are universally compatible with a wide variety of circuit breakers.

In summary, there is a need for a racking device that is easy and quick to set-up, is portable and easy to maneuver, is compatible with numerous circuit breaker models, is remotely operable, and which requires minimal programming.

There is, therefore, room for improvement in racking devices and in power modules for racking devices.

SUMMARY OF THE INVENTION

These needs and others are satisfied by the present invention, which is directed to a racking device having a relatively compact and simplified design, including an improved power module which enables the quick and easy manipulation of a wide variety of electrical apparatus with respect to a housing structure.

As one aspect of the invention, a power module is for a racking device having a base and a guide rail extending substantially vertically from the base. The racking device is structured to manipulate an electrical apparatus with respect to a housing structure and comprises: an enclosure including a pair of opposing openings structured to receive the guide rail of the racking device; a counter-balanced guide assembly structured to interconnect the guide rail and the power module in order to facilitate vertical movement of the power module with respect to the base of the racking device; an actuator substantially enclosed within the enclosure; and a linkage assembly coupled to the actuator and structured to be coupled to the electrical apparatus, the actuator being structured to move the linkage assembly thereby moving the electrical apparatus with respect to the housing structure.

The actuator may comprise a motor including a drive member and a torque member and the linkage assembly may comprise at least one of an end effector and at least one connector wherein the end effector is structured to be coupled to the electrical apparatus and, the at least one connector is structured to couple the torque member to the end effector. The motor actuates the drive member which moves the torque member and the at least one of an end effector and at least one connector, in order to at least partially insert or remove the electrical apparatus with respect to the housing structure.

As another aspect of the invention, a power module is for a racking device having a base and a guide rail extending substantially vertically from the base. The racking device is structured to manipulate an electrical apparatus with respect to a housing structure and comprises: an enclosure including a pair of opposing openings structured to receive the guide rail of the racking device; a counter-balanced guide assembly structured to interconnect the guide rail and the power module in order to facilitate vertical movement of the power module with respect to the base of the racking device; an actuator substantially enclosed within the enclosure; a linkage assembly coupled to the actuator and structured to be coupled to the electrical apparatus, the actuator being structured to move the linkage assembly thereby moving the electrical apparatus with respect to the housing structure; and a controller structured to operate the power module and the actuator thereof from a remote location in order to perform a racking operation of the electrical apparatus from the remote location.

The power module may include a status indicator structured to provide an indication of the status of the racking operation, which is readily apparent from the remote location.

As another aspect of the invention, a racking device is for performing a racking operation of an electrical apparatus with respect to a housing structure. The racking device comprises: a base including a maneuvering mechanism structured to facilitate moving the racking device and positioning the racking device with respect to the housing structure; an elongated tubular member extending substantially vertically from the base; and a counter-balanced power module structured to perform the racking operation of the electrical apparatus, the counter-balanced power module comprising: an enclosure including a pair of opposing openings for receiving the elongated tubular member therethrough, a counterweight system structured to facilitate vertical movement of the counter-balanced power module with respect to the base, the counterweight system including at least one weight, at least one pulley coupled to the elongated tubular member, and at least one cable coupled at one end to the at least one weight, extending over the at least one pulley, and coupled at the other end to the counter-balanced power module, an actuator substantially enclosed within the enclosure, and a linkage assembly coupled to the actuator and structured to be coupled to the electrical apparatus, the actuator being structured to move the linkage assembly thereby moving the electrical apparatus in order to perform the racking operation.

The at least one weight of the counterweight system may be structured to counter-balance at least a portion of the mass of the power module in order to further facilitate vertical movement of the power module with respect to the base of the racking device. The weight, the pulley, and the cable of the counterweight system may be disposed within the elongated tubular member. The counter-balanced power module may further include a plurality of guide members, such as guide wheels, that are structured to engage the elongated tubular member in order to align and further facilitate vertical movement of the counter-balanced power module on the elongated tubular member.

The base may be a unitary member which does not require separate elongated foot portions and which includes a first pair of wheels and a second pair of wheels wherein the base has a lateral width and a wheelbase substantially defined by the distance between the first and second pairs of wheels, and wherein the dimension of the lateral width and the wheelbase are generally equal in order to further facilitate maneuvering the racking device.

The electrical apparatus may be a circuit breaker and the housing structure may be a switchgear cabinet.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
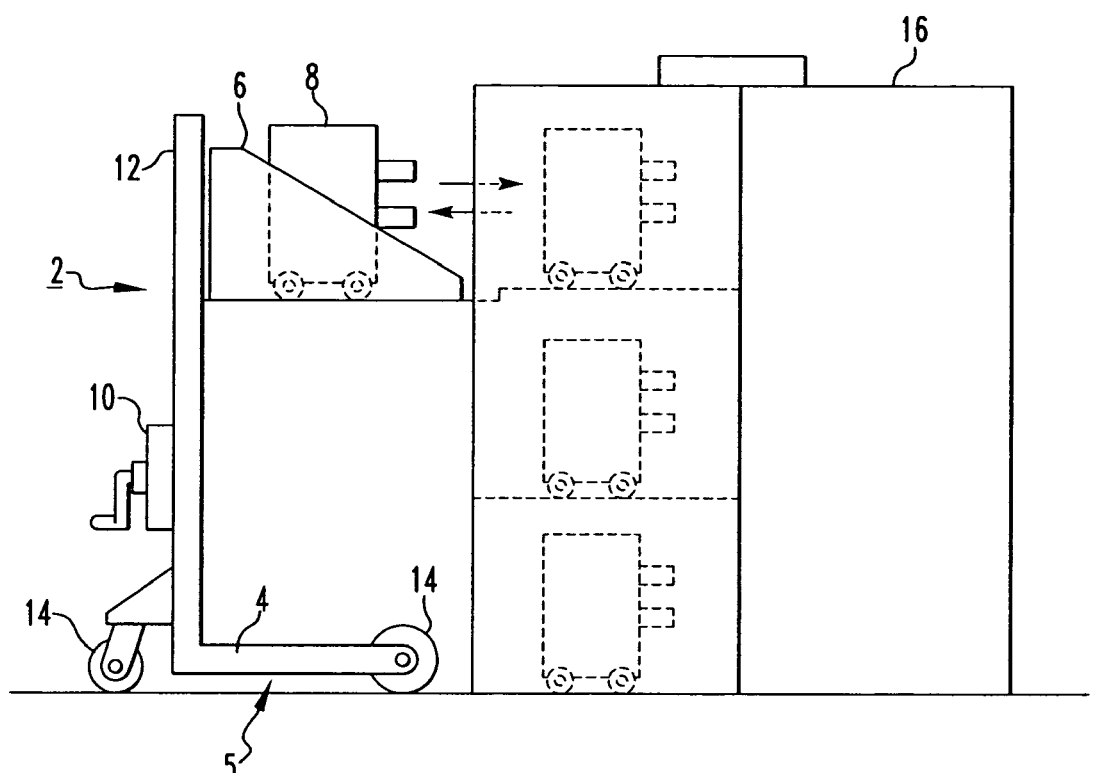
FIG. 1 is a side elevational view of a racking device shown lifting a circuit breaker for insertion into a housing structure.

For purposes of illustration, the invention will be described as applied to relatively large circuit breakers (e.g., up to about 1,000 lbs. or more), although it will become apparent that it could also be applied to other types of electrical apparatus (e.g., without limitation, circuit switching devices and other circuit interrupters such as contactors, motor starters, motor controllers and other load controllers) housed within a housing structure, such as a metallic switchgear cabinet or metal clad power circuit breaker rack structure.

Directional phrases used herein, such as, for example, left, right, top, bottom, clockwise, counterclockwise and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "racking" refers to any suitable manipulation of an electrical apparatus, such as a circuit breaker, with respect to a housing structure (e.g., without limitation, switchgear cabinet) and expressly includes, without limitation, insertion or removal of the circuit breaker from the switchgear cabinet.

As employed herein, the term "counter-balanced" shall mean structured to reduce the requisite actuation force. For example, the exemplary power module of the racking device of the invention is "counter-balanced" such that it may be moved vertically (e.g., lifted) by exerting a force which is less than the actual weight of the power module. Such counter-balancing may be accomplished by any suitable means, including, for example, without limitation, a series of springs or a counterweight system such as the exemplary weight, pulley, and cable combination illustrated and discussed herein.

As employed herein, the term "linkage" refers to any known or suitable mechanism (e.g., without limitation, a cable; a wire; a chain; a number of interconnected links; a rigid member such as a socket extension) for interconnecting one component to another in order to provide mechanical communication therebetween. For example, the exemplary linkage assembly of the invention comprises at least one of an end effector and at least one connector although other known or suitable combinations are contemplated.

Figure 2:
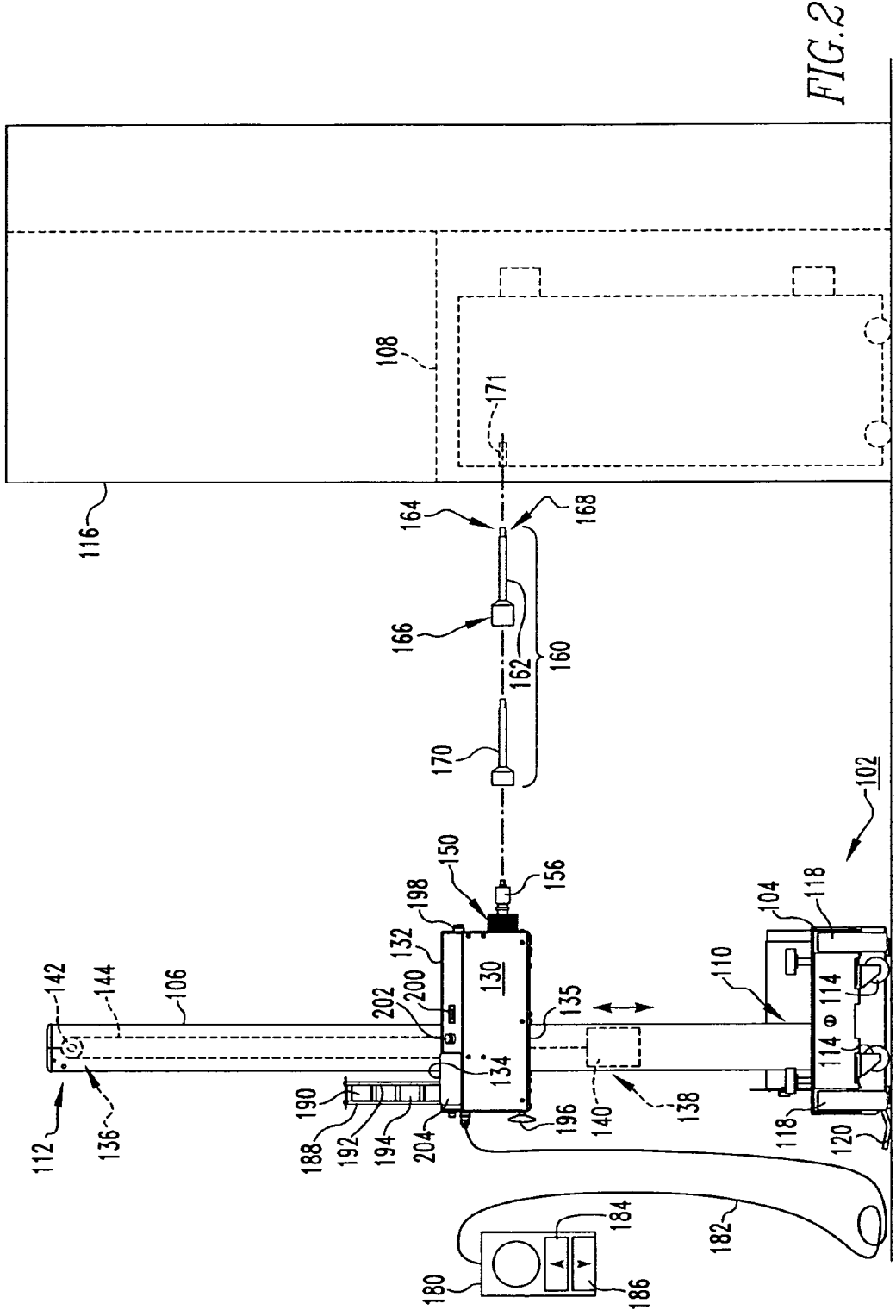
FIG. 2 is a side elevational, partially exploded view of a racking device as employed to rack a power circuit breaker in accordance with the invention, with the power circuit breaker shown in simplified form, and a counterweight system for the power module of the racking device shown in hidden line drawing.

FIG. 2 shows a racking device 102 for performing a racking operation of an electrical apparatus, such as circuit breaker 108 (shown in simplified form in hidden line drawing), with respect to a housing structure, such as the switchgear cabinet 116 shown. The racking device 102 includes a base 104 having a maneuvering mechanism 114 structured to facilitate moving the racking device 102 and positioning it with respect to the switchgear cabinet 116. A guide rail 106, which is an elongated tubular member, extends substantially vertically from the base 104, and a power module 130, which is structured to substantially perform the racking operation of the circuit breaker 108, is coupled to the guide rail 106.

The exemplary power module 130 is counter-balanced and includes an enclosure 132 having a pair of opposing openings 134,135 (best shown by opening 134 in FIG. 4) structured to receive the guide rail 106 of the racking device 102 therethrough. In the example of FIG. 2, the power module 130 further includes a counter-balanced guide assembly 136 which generally comprises a counterweight system 138 structured to facilitate vertical movement of the counter-balanced power module 130 with respect to the base 104. Specifically, the counterweight system 138 includes at least one weight 140, at least one pulley 142 coupled to the guide rail 106, and at least one cable 144. As shown in FIG. 2, and as previously discussed, the guide rail 106 is an elongated tubular member having a first end 110 coupled to the base 104 of the racking device 102, and a second end 1112. The exemplary counterweight system 138 includes one counterweight 140, one pulley 142 coupled to the second end 112 of the guide rail 106, and one cable 144, all of which are disposed within the elongated tubular member 106, as shown. More specifically, the first end of cable 144 is coupled to the counterweight 140. The cable 144 then extends upward (from the perspective of FIG. 2) over the exemplary pulley 142 coupled at the top of the guide rail 106, as shown, and then extends downward (from the perspective of FIG. 2) in order to couple, at the opposite end, to the power module 130. In this manner, the counterweight system 138 functions to counter-balance at least a portion of the mass of the power module 130 in order to further facilitate vertical movement of the power module 130 with respect to the base 104 of the racking device 102. In the example of FIG. 2, the weight of the exemplary counterweight 140 is generally equal to the mass of the power module 130. As employed herein, the term "mass" is substantially interchangeable with the term "weight," but is used for simplicity of disclosure to differentiate the "mass" of the power module 130 from the "weight" 140 of the counterweight system 138. Accordingly, as will be discussed in further detail hereinbelow, because of the counter-balanced nature of the exemplary power module 130 of the invention, alignment of the power module 130 with the circuit breaker 108, is quick and easy to achieve. The exemplary counterweight system 138 is also contemplated as having a quick-disconnect fastener (not shown) between the cable 144 and the power module 130 which allows the power module 130 to be quickly and easily removed and replaced with another module (not shown). It will be appreciated, however, that the configuration of the counterweight system 138 is not limited to the example shown and discussed herein. Any known or suitable alternative configuration could be employed. It will also be appreciated from the disclosure herein that an alternative counter-balancing mechanism, such as, for example, a plurality of springs (not shown) or other suitable resilient members, could be employed in place of the exemplary counterweight system 138.

Continuing to refer to FIG. 2, the power module 130 also includes an actuator 150 generally enclosed (except for the torque member 156) within the power module enclosure 132 when it is retracted as shown, or by a Bellows when it is extended (not shown). The Bellows is a cover for the ball spline 154 (FIG. 4) to protect the ball spline 154, from dust, for example, as it extends from the enclosure 132 during a racking operation. A linkage assembly 160 coupled to the actuator 150 and structured to be coupled to the circuit breaker 108. The linkage assembly 160 includes at least one of an end effector 162 and at least one connector 170. The end effector 162 has a first end 164 structured to be coupled to the circuit breaker 108 and a second end 166 coupled directly to one of the connector 170, as shown, or a torque member 156 of the actuator 150. In other words, while the exemplary linkage assembly 160 includes both the connector 170 and the end effector 162, only one component (e.g., the end effector 162) is actually necessary. The exemplary connector 170 is a conventional socket extension of the type commonly available in a standard socket set and used with power tools (e.g., without limitation, a torque wrench). Therefore, the connector 170 provides a convenient tool for extending the reach of the racking device 102 in order to engage a variety of electrical apparatus (e.g., circuit breaker 108) to perform racking operations thereon. It will be appreciated that more than one connector 170 may be employed between the end effector 162 and actuator 150.

The exemplary end effector 162 includes a first end 164 structured to engage the circuit breaker 108 at a circuit breaker interface 171. The interface 171 often varies depending on the type of circuit breaker 108 being racked. Accordingly, different end effectors 162 having different, corresponding engaging means 168, are selected in order to engage the particular circuit breaker 108. By way of example, the engaging means for engaging interface 171 often comprises conventional hex head socket 168 similar to that of connector 170. Other times, the circuit breaker will have as the interface, a pin (not shown). An end effector having a corresponding groove (not shown) is then selected and employed. However, it will be appreciated that any known or suitable alternative engaging means 168 could be employed.

Figure 3:
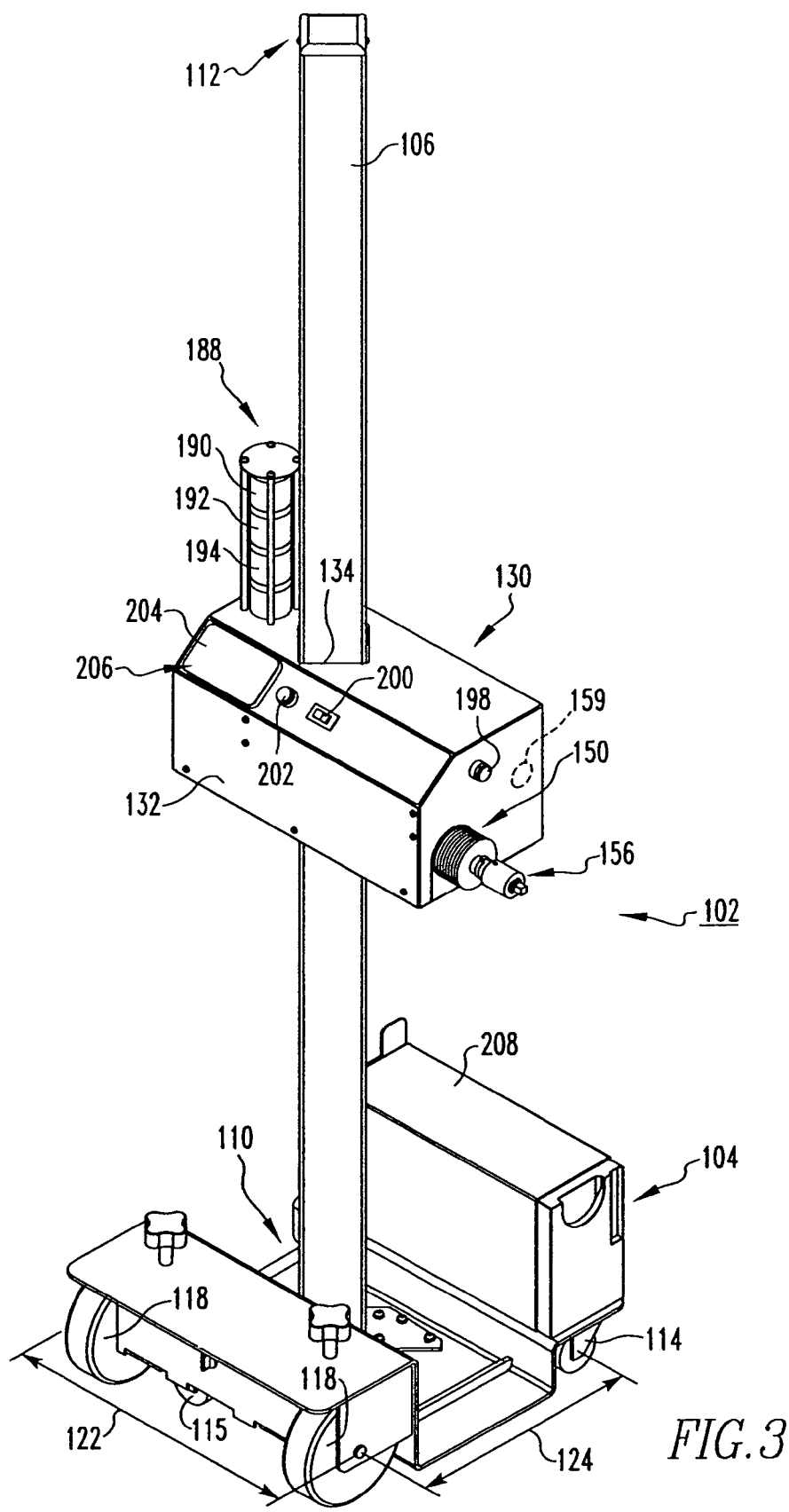
FIG. 3 is an isometric view of the racking device of FIG. 2.

As will be appreciated with reference to FIGS. 2 and 3, in operation, the racking device 102 is first maneuvered into a position which is generally aligned with the front of the switchgear cabinet 116 (FIG. 2). This operation is made easier by a number of unique features of the invention. Specifically, the base 104 of the racking device 102 comprises a unitary member which eliminates the elongated and cumbersome foot portion frame members of known racking devices (e.g., base 5 of frame 4 of the racking device 2 of FIG. 1). The base 104 further includes a maneuvering mechanism consisting of a plurality of wheels 114,118 and a brake 120 (FIG. 2). At least two of the wheels 114 pivot in order to provide the base 104 with 360 degrees of rotation. As partially shown in FIG. 3, the exemplary base 104 has four castoring wheels 114,115 (two wheels 114,115 are shown). Additionally, although other configurations are within the scope of the invention, the exemplary wheels 114,118 are arranged in opposing first and second pairs 114,118 with the exemplary second pair 118 comprising a relatively large, robust pair of wheels which are larger in diameter than wheels 114 and are, therefore, suitable to traverse rough terrain. The base 104 has a wheel base 124 (FIG. 3) which is substantially defined by the distance between the first and second pairs of wheels 114, 118. The base 104 also has a lateral width 122, as shown in FIG. 3. As best shown in FIG. 3, the example dimensions of lateral width 122 and the wheel base 124 (FIG. 3), are generally equivalent. Such a design further aids quick and easy maneuvering of the racking device 102. Additionally, the relatively short wheel base 124 enables the entire racking device 102 to be tilted (not shown) for easy movement of the device, for example, using a single pair of the wheels (e.g., second pair 118) and using the guide rail 106 to maneuver the device 102 in a manner similar to the way a dolly or handtruck is used to move items. Accordingly, the overall generally small and compact design of the exemplary racking device 102, in comparison with known devices (e.g., racking device 2 of FIG. 1) further simplifies transport and application of the device 102.

The brake 120 (FIG. 2) of the racking device 102 can be actuated in order to lock the base 104 in place. This operation is typically performed after final set-up and alignment of the racking device 102 is achieved, but may alternatively be done any time it is desired to hold the position of the device 102, for example, with respect to the switchgear cabinet 1116 (FIG. 2). The exemplary brake is a single foot actuated brake 120 (FIG. 2) although any known or suitable alternative braking mechanism (not shown) could be employed. Next, the end effector 162 is inserted into the circuit breaker interface 171 (FIG. 2). The extension 170 is then coupled to the torque member 156 of the actuator 150 and the counter-balanced power module 130 is adjusted vertically upon the guide rail 106 in order to generally align the extension 170 with the second end 166 of the end effector 162. Due to the aforementioned counter-balanced nature of the power module 130, such vertical adjustment requires only a few pounds of force making it extremely easy to perform. Next, a positive pressure knob 196 disposed on the enclosure 132 of the power module 130, as shown in FIG. 2, can be actuated in order to extend the extension 170 for insertion into the second end 166 of the end effector 162. If additional alignment or adjustment is required, a jog button 198 disposed on the power module 130, as shown in FIGS. 2 and 3, may be employed to make relatively minor adjustments and complete the engagement process. Once aligned and engaged, an insert/remove switch 200 on the power module 130 is actuated to select the desired insertion or removal racking operation. The actuator 150 of the exemplary power module 130 may be preprogrammed to perform racking operations on a variety of different electrical apparatus (e.g., circuit breaker 108 of FIG. 2). If the electrical apparatus 108 being manipulated is one of such pre-programmed apparatus, it may be selected by actuating a breaker select button 202 on the enclosure 132 of the power module 130. A visual display 204 on the exterior of the enclosure 132 facilitates this process. However, it will be appreciated that the exemplary power module 130 need not be pre-programmed or pre-programmable.

As previously discussed, in order to avoid potential danger associated with, for example, arc flash that may occur during a racking operation, it is necessary to perform the racking operation from a location remote from the racking device 102. In order to accomplish this goal, the exemplary racking device 102 includes a remote electrical switch module 180 including the number of directional controls on switches 184,186 for remotely operating the power module 130 and actuator 150 thereof, from the remote location (e.g., about 25 feet or more from the open or closed face of the switchgear cabinet 116 (FIG. 2)). The exemplary switch module 180 is a handhold module containing a first directional switch or insert button 184 and a second directional switch or remove button 186, as shown in FIG. 2, although other configurations could be employed. For example, while the exemplary remote electrical switch module 180 is coupled to the power module 130 by way of an electrical cable 182, it could be a remote control (not shown) without any mechanical connection with the power module 130.

The exemplary power module 130 further includes a status indicator 188 which is readily viewable from the remote location. The status indicator 188 in the example of FIGS. 2 and 3, includes three different colored lights, a green light 190, an amber light 192 and a red light 194. For the insertion process, the green light 190 indicates that the unit is in a state safe to initiate a racking operation of the breaker 108, and the red light 194 illuminates when the process is completed successfully. For the removal process, the red light 194 indicates that the unit is in a state safe to initiate a racking out operation of the breaker, and the green light 190 illuminates when the process is completed successfully. The amber light 192 illuminates during a racking operation in order to provide a warning to stay clear of the switchgear cabinet 116. A racking operation that does not complete successfully is indicated by alternately flashing amber and red lights 192,194. Of course, other light indicator sequences could be employed or other known or suitable indicators (not shown) could be used instead of the exemplary indicator 188.

Insertion or removal of the circuit breaker 108 may be accomplished manually (e.g., by merely depressing one of the directional buttons 184,186 of switch module 180), or by selecting a pre-programmed racking operation and initiating such racking operation by actuating the correct directional control button 184,186. Specifically, as will be understood with reference to FIG. 4, the exemplary racking procedure is accomplished by achieving a number of turns of the actuator 150. The exemplary actuator 150 comprises a motor 152 including a drive member, such as the exemplary ball spline 154 (shown in hidden line drawing), and the torque member 156. The exemplary actuator assembly 150 is driven by a drive chain 158 connecting the motor 152 to the torque member 156 by way of a pair of sprockets 155,157. Accordingly, the motor 152 is structured to actuate the ball spline 154 by way of the chain 158 driven torque member 156 which rotates the ball spline 154. The ball spline 154 extends from the power module casing 132 as a result of constant force springs 185, thereby driving the linkage assembly 160 (FIG. 2) connected thereto and to the circuit breaker 108 (FIG. 2), which results in the insertion of the circuit breaker 108 from the switchgear cabinet 116 (FIG. 2). Specifically, a constant outward force is maintained on the ball spline shaft 154 by the arrangement of constant force springs 185. Rather than exerting a force which, for example increases with displacement like conventional torsion or coil springs, the exemplary constant force springs 185 apply a constant force in order to bias the ball spline 154 outward and maintain attachment between the end effector 162 (FIG. 2) and circuit breaker interface 171 (FIG. 2). In other words, a constant force, towards the circuit breaker 108, is maintained throughout the racking operation. Conversely, during a circuit breaker extraction operation, the ball spline 154 retracts within the power module casing 132 in response to the inward force exerted by the circuit breaker 108 on the ball spline 154. Accordingly, the rotation and translation of the exemplary ball spline 154 are independent of one another.

To prevent possible injury to an operator, for example, by uncontrolled acceleration of the ball spline shaft 154 due to the aforementioned spring bias, the ball spline shaft 154 is coupled to a rotary damper 187 through another constant force spring 189. This spring 189 is used as both an interconnecting mechanism and as a recoil mechanism for the damper 187 in order to restrict the velocity of the shaft 154 when it exits the enclosure 132. More specifically, a latch (not shown) is provided to hold the ball spline shaft 154 at its fully withdrawn position (shown), and a switch (not shown) is employed to ensure that the latch is released before an insertion or removal racking process will be started. A multi-turn potentiometer 191 is coupled to the rotary damper 187 in order to detect or infer the ball spline shaft 154 position thereby determining whether or not sufficient shaft travel is available to complete the racking process for the selected breaker type. Accordingly, it will be appreciated that the actuator 150 can be pre-programmed, as previously discussed, in order to turn the exemplary ball spline shaft 154 (FIG. 4) a predetermined number of turns corresponding to, for example, the racking characteristics of the particular electrical apparatus (e.g., circuit breaker 108 of FIG. 2) being manipulated. The programming generally involves counting the number of turns of the ball spline shaft 154 and monitoring the current provided by the motor 152. Therefore, in operation, the ball spline 154 is driven slowly initially and near the end of the racking operation in order to, for example, ensure that torque is not excessively high. For example, if excessive torque is not detected, the speed is increased as the racking operation is performed, until a certain number of turns are achieved, at which point the speed is decreased again until the current indicates a spike in the torque, which is indicative of the circuit breaker 108 being fully racked (e.g., inserted) or fully removed. To protect against damage, due to such sudden torque increases, the exemplary torque member comprises a slip clutch 156 which slips at a predetermined level of torque to avoid damaging circuit breaker components. This pre-programming in the example of FIG. 3, is accomplished by way of a suitable processor or computer 206 disposed within the power module 130 of the racking device 102. Thus, essentially all of the electronics (e.g., without limitation, computer 206) of the exemplary racking device 102 are disposed within the power module 130, which is, therefore self-contained and thus removable, replaceable, and interchangeable with other power modules, for example, having a different size motor.

Figure 4:
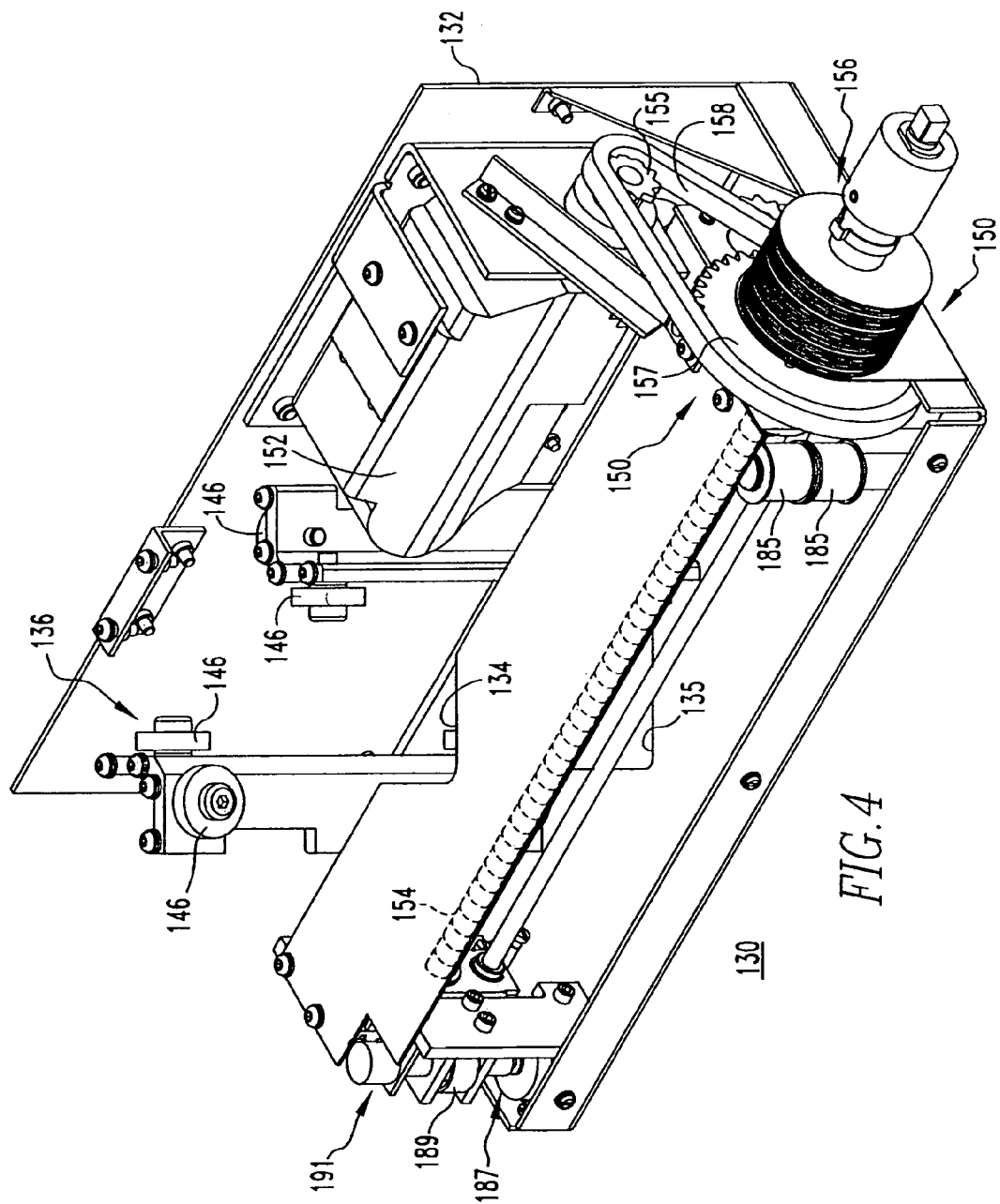
FIG. 4 is an isometric view of the internal components of the power module for the racking device of FIG. 3, with a ball spline drive member shown in hidden line drawing.

It will be appreciated, with reference to FIGS. 3 and 4, that a direct drive adapter (not shown), for coupling, for example, the socket extension 170 of FIG. 2, directly to the sprocket 155 (FIG. 4) instead of employing the aforementioned gear reduction and ball spline 154 and drive member 150 (FIG. 4), is also contemplated by the invention. More specifically, such direct drive would couple directly to the motor 152 (FIG. 4) proximate the sprocket 155 in order to provide the higher speeds and mechanical advantage offered by a direct drive, which is suitable for certain circuit breaker racking operations. Access for attaching the direct drive adapter (not shown) to the motor 152 (FIG. 4) would be provided through an access hole 159 (shown in phantom line drawing in FIG. 3) in the power module enclosure 132.

Accordingly, the invention provides a racking device 102 with a unique combination of features, including an interchangeable counter-balanced, self-contained power module 130, a unitary, tightly-coupled (e.g., relatively short wheel base 124) base 104 with a plurality of maneuverable wheels 114,118, a single guide rail 106, a constant force spring arrangement, and a novel ball spline driven actuator 150 in order to provide the racking device 102 with many advantages. Among them are that it is easy and quick to set-up, portable, easy to maneuver, compatible with a variety of different electrical apparatus, and requires minimal programming. Specifically, unlike known racking devices (e.g., racking device 2 of FIG. 1) which require complex profiling of electrical apparatus including programming the exemplary racking device 102 efficiently and effectively performs a verity of racking operations on a wide array of different electrical apparatus, without requiring operator programming.

Additional features, such as the aforementioned wheels 1118 which are suitable for uneven or rough terrain, and convenient features such as an integrated storage locker 208 (FIG. 3) at the base 104 for storing, for example various end effectors, and a latch (not shown) for locking the power module in the lowest position during shipping or transportation, further add to the utility and efficiency of the racking device of the invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A power module for a racking device having a base and a guide rail extending substantially vertically from said base, said racking device being structured to manipulate an electrical apparatus with respect to a housing structure, said power module comprising:

an enclosure including a pair of opposing openings structured to receive said guide rail of said racking device;
a counter-balanced guide assembly structured to interconnect said guide rail and said power module in order to facilitate vertical movement of said power module with respect to said base of said racking device;
an actuator generally enclosed within said enclosure; and
a linkage assembly coupled to said actuator and structured to be coupled to said electrical apparatus, said actuator being structured to move said linkage assembly thereby moving said electrical apparatus with respect to said housing structure.

2. The power module of claim 1 wherein said actuator comprises a motor including a drive member and a torque member; wherein said linkage assembly comprises at least one of an end effector and at least one connector, said end effector being structured to be coupled to said electrical apparatus, said at least one connector being structured to couple said torque member to said end effector; and wherein said motor is structured to actuate said drive member which moves said torque member and at least one of said end effector and said at least one connector, in order to at least partially insert or remove said electrical apparatus with respect to said housing structure.

3. The power module of claim 2 wherein said end effector has a first end structured to be coupled to said electrical apparatus, and a second end coupled directly to one of said at least one connector and said torque member.

4. The power module of claim 2 wherein said drive member is a ball spline structured to extend and retract said linkage assembly and said electrical apparatus coupled to said linkage assembly.

5. The power module of claim 2 wherein said at least one connector is a socket extension.

6. A power module for a racking device having a base and a guide rail extending substantially vertically from said base, said racking device being structured to manipulate an electrical apparatus with respect to a housing structure, said power module comprising:
an enclosure including a pair of opposing openings structured to receive said guide rail of said racking device;
a counter-balanced guide assembly structured to interconnect said guide rail and said power module in order to facilitate vertical movement of said power module with respect to said base of said racking device;
an actuator generally enclosed within said enclosure;
a linkage assembly coupled to said actuator and structured to be coupled to said electrical apparatus, said actuator being structured to move said linkage assembly thereby moving said electrical apparatus with respect to said housing structure; and
a switch module structured to operate said power module and said actuator thereof from a remote location in order to perform a racking operation of said electrical apparatus from said remote location.

7. The power module of claim 6 wherein said power module includes a status indicator structured to provide an indication of the status of said racking operation, which is readily apparent from said remote location.

8. The power module of claim 6 wherein said power module is structured to be quickly disconnected from said counter-balanced guide assembly; and
wherein said power module is self-contained in order that it can be readily removed and replaced.

9. A racking device for performing a racking operation of an electrical apparatus with respect to a housing structure, said racking device comprising:
a base including a maneuvering mechanism structured to facilitate moving said racking device and positioning said racking device with respect to said housing structure;
an elongated tubular member extending substantially vertically from said base; and
a counter-balanced power module structured to perform said racking operation of said electrical apparatus, said counter-balanced power module comprising:
an enclosure including a pair of opposing openings for receiving said elongated tubular member therethrough,
a counterweight system structured to facilitate vertical movement of said counter-balanced power module with respect to said base, said counterweight system including at least one weight, at least one pulley coupled to said elongated tubular member, and at least one cable coupled at one end to said at least one weight, extending over said at least one pulley, and coupled at the other end to said counter-balanced power module,
an actuator generally enclosed within said enclosure, and
a linkage assembly coupled to said actuator and structured to be coupled to said electrical apparatus, said actuator being structured to move said linkage assembly thereby moving said electrical apparatus in order to perform said racking operation.

10. The racking device of claim 9 wherein said counter-balanced power module has a mass; and wherein said at least one weight of said counterweight system is structured to counter-balance at least a portion of the mass of said power module in order to further facilitate vertical movement of said power module with respect to said base of said racking device.

11. The racking device of claim 10 wherein said elongated tubular member has a first end structured to be coupled to said base of said racking device, and a second end; wherein said at least one weight of said counterweight system is a weight; wherein said at least one pulley is a pulley structured to be coupled proximate the second end of said elongated tubular member; wherein said at least one cable is a cable; and wherein said weight, said pulley, and said cable are disposed within said elongated tubular member.

12. The racking device of claim 9 wherein said counter-balanced power module includes a plurality of guide members structured to engage said elongated tubular member in order to align and further facilitate vertical movement of said counter-balanced power module on said elongated tubular member.

13. The racking device of claim 12 wherein said plurality of guide members are a plurality of guide wheels.

14. The racking device of claim 9 wherein said maneuvering mechanism of said base comprises a plurality of wheels and a brake; wherein at least two of said wheels are pivoting wheels; and wherein said brake is structured to lock said base once said racking device is positioned with respect to said housing structure.

15. The racking device of claim 14 wherein said base is a unitary member which does not require separate elongated foot portions; wherein said plurality of wheels include a first pair of wheels and a second pair of wheels; wherein said base has a lateral width and a wheelbase substantially defined by the distance between said first and second pairs of wheels; and wherein the dimension of said lateral width and said wheelbase are generally equal in order to further facilitate maneuvering said racking device.

16. The racking device of claim 9 wherein said actuator comprises a motor including a drive member and a torque member; wherein said linkage assembly comprises at least one of an end effector and at least one connector; wherein said end effector has a first end and a second end coupled directly to one of said at least one connector and said torque member; wherein said at least one connector is structured to couple said torque member to said end effector; and wherein said motor is structured to actuate said drive member which moves said torque member and said at least one of said end effector and said at least one connector, in order to at least partially insert or remove said electrical apparatus with respect to said housing structure.

17. The racking device of claim 9 wherein said counter-balanced power module includes a switch module and a status indicator; wherein said switch module is adapted to operate said counter-balanced power module and said actuator thereof from a remote location; and wherein said status indicator provides an indication of the status of said racking operation, said indication being readily apparent from said remote location.

19. The racking device of claim 9 wherein said electrical apparatus is a circuit breaker; and wherein said housing structure is a switchgear cabinet.

19. The racking device of claim 9 wherein said counter-balanced power module is structured to quickly disconnect from the other end of said at least one cable; and wherein said counter-balanced power module is self-contained in order that it can be readily removed and replaced.

20. The racking device of claim 9 wherein said base includes an integrated tool storage locker.

\* \* \* \* \*